(12) United States Patent
Agrawal et al.

(10) Patent No.: US 9,325,581 B2
(45) Date of Patent: *Apr. 26, 2016

(54) CONTEXT-AWARE MANAGEMENT OF APPLICATIONS AT THE EDGE OF A NETWORK

(71) Applicant: International Business Machines Corporation, Armonk, NY (US)

(72) Inventors: Dakshi Agrawal, Monsey, NY (US); Chatschik Bisdikian, Chappaqua, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/855,171

(22) Filed: Apr. 2, 2013

(65) Prior Publication Data

US 2014/0297822 A1   Oct. 2, 2014

(51) Int. Cl.
*G06F 15/16* (2006.01)
*H04L 12/24* (2006.01)
*H04W 24/02* (2009.01)

(52) U.S. Cl.
CPC .......... *H04L 41/50* (2013.01); *H04L 41/5051* (2013.01); *H04W 24/02* (2013.01)

(58) Field of Classification Search
CPC . H04L 43/0829; H04L 41/50; H04L 41/5051; H04L 67/2842; G06F 15/16; G06F 17/30902; G06F 17/30598
USPC ........................... 709/201, 206, 223; 370/235
See application file for complete search history.

(56) References Cited

U.S. PATENT DOCUMENTS

| 7,127,713 B2* | 10/2006 | Davis ................. H04L 63/0227 717/177 |
| 8,456,995 B2* | 6/2013 | Fujihira ................. H04L 45/50 370/235 |
| 8,898,623 B2* | 11/2014 | Zhao et al. ..................... 717/105 |
| 2003/0014147 A1* | 1/2003 | Ignagni ................ D21G 9/0054 700/129 |
| 2005/0114493 A1 | 5/2005 | Mandato et al. .............. 719/316 |
| 2008/0037425 A1* | 2/2008 | Pan .................... H04L 29/06027 370/235 |

(Continued)

FOREIGN PATENT DOCUMENTS

| EP | 2 315 412 A1 | 4/2011 | ............. H04L 29/06 |
| EP | 2 403 290 A1 | 1/2012 | ............ H04W 28/10 |

(Continued)

OTHER PUBLICATIONS

Falchuk, B. et al.; Mobile contextual mashup service for IMS, INSPEC, AN-10414964; 2008.

(Continued)

*Primary Examiner* — Tesfay Yohannes
(74) *Attorney, Agent, or Firm* — Ido Tuchman; Mercedes L. Hobson

(57) ABSTRACT

A method, system and computer program for operating and managing data and application services at an edge of a network. An example method includes executing an application on an edge node. The edge node provides services to mobile device end users on the edge of a network. The method may include identifying an operating context for executing an application on an edge node. A management step manages the operation and lifecycle of the application on the edge node in response to the identified operating context.

7 Claims, 4 Drawing Sheets

(56) References Cited

U.S. PATENT DOCUMENTS

| | | | | |
|---|---|---|---|---|
| 2008/0194233 | A1 | 8/2008 | Henry | 455/411 |
| 2009/0037570 | A1* | 2/2009 | Yu et al. | 709/224 |
| 2009/0060359 | A1* | 3/2009 | Kim | H04N 19/563 |
| | | | | 382/236 |
| 2009/0274106 | A1* | 11/2009 | Weerakoon | H04L 12/5695 |
| | | | | 370/329 |
| 2009/0317852 | A1* | 12/2009 | Parker et al. | 435/29 |
| 2010/0037136 | A1* | 2/2010 | Choudhary | G06F 17/5045 |
| | | | | 715/708 |
| 2010/0100546 | A1 | 4/2010 | Kohler | 707/739 |
| 2010/0281440 | A1* | 11/2010 | Underkoffler | G06F 3/017 |
| | | | | 715/863 |
| 2011/0145258 | A1* | 6/2011 | Kankainen | G06Q 10/10 |
| | | | | 707/746 |
| 2012/0084798 | A1* | 4/2012 | Reeves | H04L 67/1095 |
| | | | | 719/319 |
| 2012/0164243 | A1* | 6/2012 | Rinsch et al. | 424/725 |
| 2012/0246214 | A1* | 9/2012 | Ogawa | G06F 9/5094 |
| | | | | 709/201 |
| 2012/0296995 | A1* | 11/2012 | Yan | G06Q 50/01 |
| | | | | 709/206 |
| 2013/0218053 | A1* | 8/2013 | Kaiser et al. | 600/595 |
| 2013/0345530 | A1* | 12/2013 | McRoberts | A61B 5/0022 |
| | | | | 600/323 |
| 2014/0179270 | A1* | 6/2014 | Anand | 455/410 |
| 2014/0323130 | A1* | 10/2014 | Kowshik | H04W 36/245 |
| | | | | 455/436 |

FOREIGN PATENT DOCUMENTS

| | | | | |
|---|---|---|---|---|
| GB | 2473717 A | 3/2011 | | H40W 28/16 |
| GB | 2481659 A | 1/2012 | | H04W 28/16 |
| GB | 2481715 A | 1/2012 | | H04L 12/2634 |
| GB | 2481721 A | 1/2012 | | G06Q 30/00 |
| GB | 2481722 A | 1/2012 | | H04N 7/18 |
| GB | 2481899 A | 1/2012 | | H04W 28/16 |

OTHER PUBLICATIONS

Strassner, J.; Policy-Based Context-Aware Management for Autonomic Networks, Ip.com, Jan. 16, 2007.

Beg, A. et al.; Providing Services in Node Network Modal, Ip.com, Mar. 31, 2005.

Houyou, AM. et al.; Performance evaluation of overlay-based range queries in mobile systems; INSPEC, AN-10337495; 2008.

* cited by examiner

CONTEXT-AWARE MANAGEMENT OF APPLICATIONS AT THE EDGE OF A NETWORK

BACKGROUND

The present invention relates to computer software applications, and more particularly to managing and operating data and applications at the edge of a network.

In typical cellular data networks, network providers with data processing and application servicing capabilities, enhance nodes at the edge of their networks to improve response times, decrease backhaul congestion, and enhance the overall quality of experience. The data processing capabilities may include data traffic re-routing or byte caching while servicing capabilities may include providing an entire point of presence for an application at the edge, web serving/caching, gaming, location based services and etc.

While existing solutions provide for the presence of data processing and application servicing capabilities at edge network nodes, they have typically been considered in the form of static instances for the presence of these capabilities. The stated capabilities may exist in hardware or software bundles that may need to be entirely replaced when the new capabilities become available. They may also require human intervention to install the new capability on location. The problem may be further exacerbated when the operator owns equipment from various manufacturers, each requiring their own way of implementing the capability. They also require this same process when the operational aspect of a service requires contextual input that may be different from location to location, such as a local map.

BRIEF SUMMARY

Accordingly, one example of the present invention is a method for operating and managing data and application services at an edge of a network. The method includes executing an application on an edge node. The edge node provides services to mobile device end users on the edge of the network. The method further includes identifying an operating context for executing the application on the edge node. The method further includes managing the operation and lifecycle of the application on the edge node in response to the identified operating context.

Another example of the present invention is a system for operating and managing data and application services at an edge of a network. The system includes a system memory and a computer processor coupled to the system memory. The system further includes an executing unit, which is also coupled to the computer processor. The executing unit executes an application on an edge node. The edge node provides services to mobile device end users on the edge of the network. The system further includes an identifying unit. The identifying unit identifies an operating context for executing the application on the edge node. The system further includes a managing unit. The managing unit manages the operation and lifecycle of the application on the edge node in response to the identified operating context.

A further example embodiment of the present invention is a computer program product for operating and managing data and application services at an edge of a network. The computer program product includes computer readable program code configured to: execute an application on an edge node, wherein the edge node provides services to mobile device end users on the edge of the network; identify an operating context for executing the application on the edge node; and manage the operation and lifecycle of the application on the edge node in response to the identified operating context.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
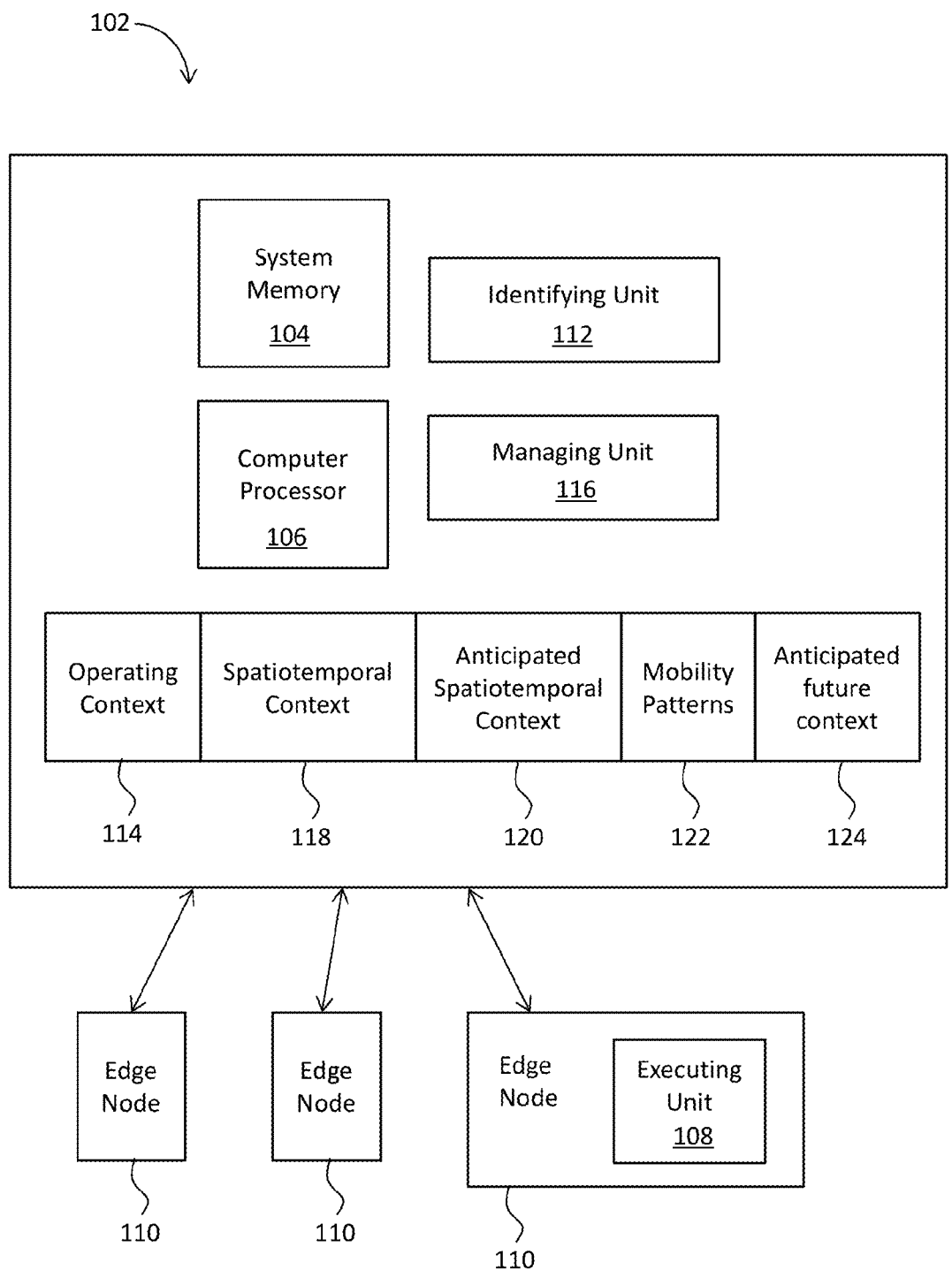
FIG. 1 shows a system for operating and managing data and application services at an edge of a network according to one embodiment of the present invention.

The present invention is described with reference to embodiments of the invention. Throughout the description of the invention reference is made to FIGS. 1-4. When referring to the figures, like structures and elements shown throughout are indicated with like reference numerals.

Embodiments of the present invention are directed toward provisioning and management of services residing at the very edge of a radio access network by considering service lifecycle aspects such as transfer (e.g., due to end-device mobility), installation, execution, monitoring, troubleshooting, modification, upgrade, replacement, activation, deactivation, and removal of these services based on current and anticipated operational context. Embodiments of the invention may further manage the application and data services in response to the identified context of the end user.

FIG. 1 shows an example system 102 for operating and managing data and application services at an edge of a network. The system may include a system memory 104, a computer processor 106, an executing unit 108, an identifying unit 112, and a managing unit 116.

The executing unit 108 is coupled to the computer processor 106 and the executing unit 108 executes an application on an edge node 110. The edge node 110 provides services to mobile device end users on the edge of a network.

The identifying unit 112 identifies an operating context 114 for executing the application on an edge node 110. The managing unit 116 manages the operation and lifecycle of the application on an edge node 110 in response to the identified operating context 114.

In one embodiment of the invention, the computer processor 106 may be configured to identify an operating context 114. The operating context 114 may include the spatiotemporal context 118 of mobile device end users. The spatiotemporal context 118 may include the anticipated spatiotemporal context 120 of mobile device end users. The anticipated spatiotemporal context 120 may depend on the mobility patterns 122 of a mobile device end user.

In one embodiment of the invention, the computer processor 106 may be configured to identify an operating context

114. The operating context 114 may include the mobility patterns 122 of mobile device end users.

In one embodiment of the invention, the computer processor 106 may be configured to select the edge node 110 for execution of the application from a plurality of edge nodes 110. The edge node 110 is responsive to the identified operating context 114. In one embodiment, the computer processor 106 may be configured to identify application services currently used by mobile device end users.

In another embodiment, the computer processor 106 may configure computer executable instructions at the edge node 110 according to the identified operating context 114. In one embodiment, the computer processor 106 is configured to provide services in response to anticipated future context 124 of the mobile device end users.

Figure 2:
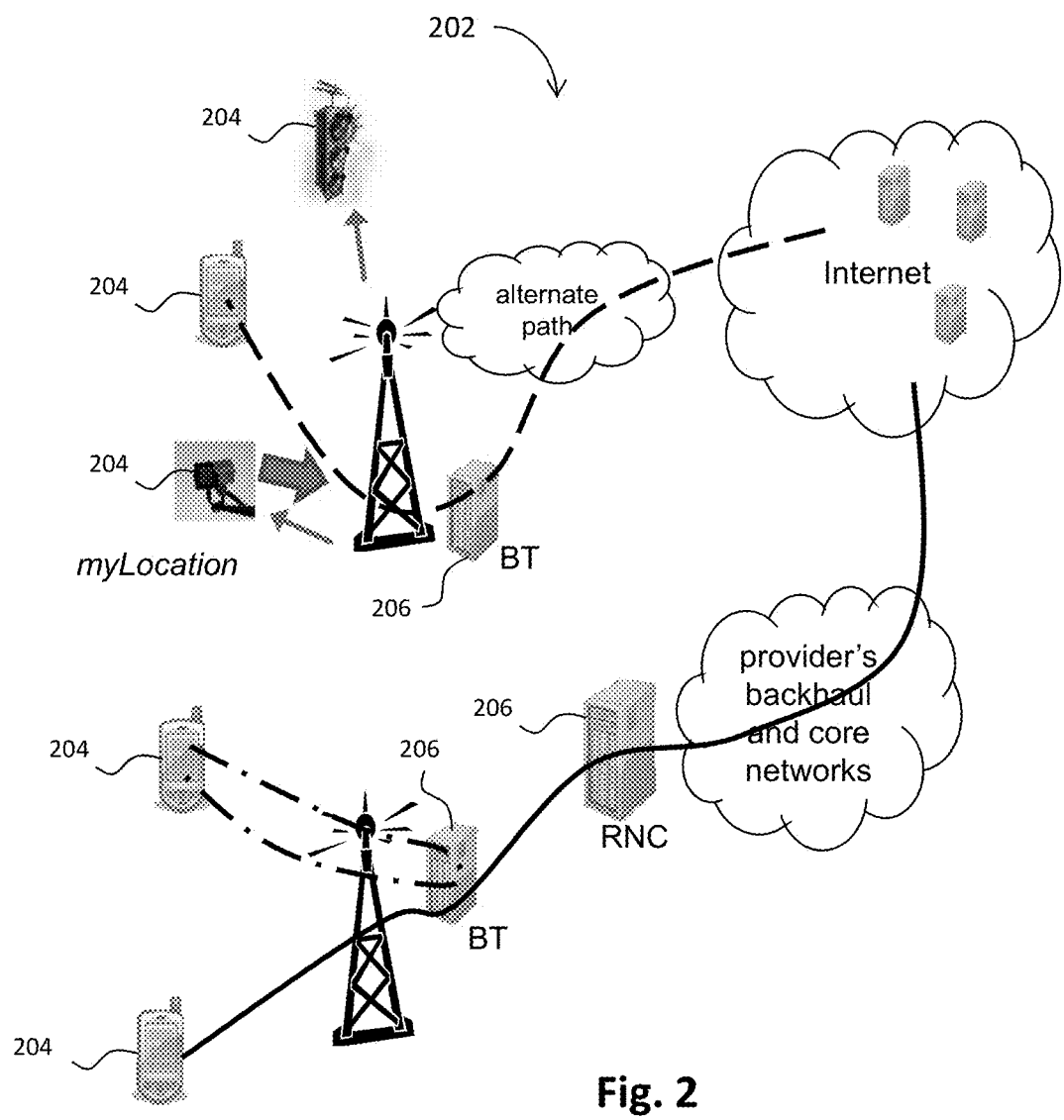
FIG. 2 shows mobile devices at the edge of a cellular network according to one embodiment of the present invention.

FIG. 2 shows a system of mobile devices at the edge of a cellular network 202 according to one embodiment of the present invention. The system shows a number of edge devices 204 such as smartphones (representing a number of relatively powerful, interactive edge computing devices), cameras (representing controllable devices that will primarily be used to produce information for consumption by other devices in mobile-to-mobile communication), and traffic lights (representing actuator devices that are primarily used to consume to contextual information they receive and act to effectuate situations). The figure also shows cellular network equipment 206 at the edge (referred to as network edge node), such as antenna towers controlled by base stations (BT), in turn controlled by remote network controllers (RNC). A traditional cellular network will carry its subscriber data traffic over its backhaul and core network to applications in the Internet.

To cope with the increasing bandwidth congestion at the backhaul from the increasing use of data services, alternative architectures are emerging where data traffic may be offloaded away from the provider's backhaul and core networks to an alternative path, for example a commercial or residential Internet connection. Such offload would typically occur at the BT (including residential femtocell base stations) or the RNC.

Figure 3:
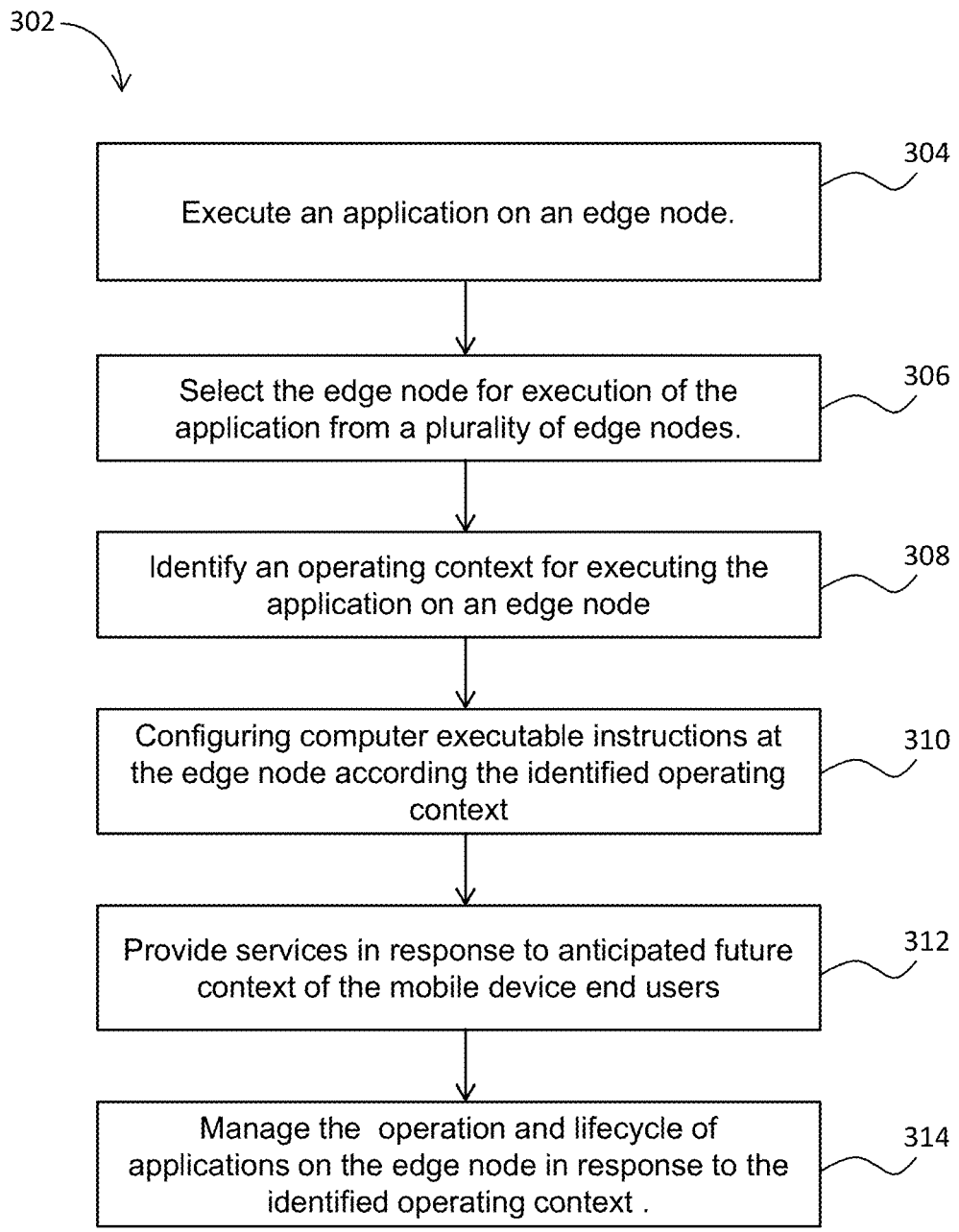
FIG. 3 shows a method for operating and managing data and application services at an edge of a network in accordance with one embodiment of the present invention.

FIG. 3 shows a method for operating and managing data and application services at an edge of a network 302, in accordance with one embodiment of the present invention. The method includes executing step 304. During the executing step 304, an application is executed on an edge node. The edge node provides services to mobile device end users on the edge of the network. After executing step 304 is completed, the method continues to selecting step 306.

At selecting step 306, edge nodes may be selected for execution of the application from a plurality of edge nodes. The edge node may be responsive to an identified operating context.

Figure 4:
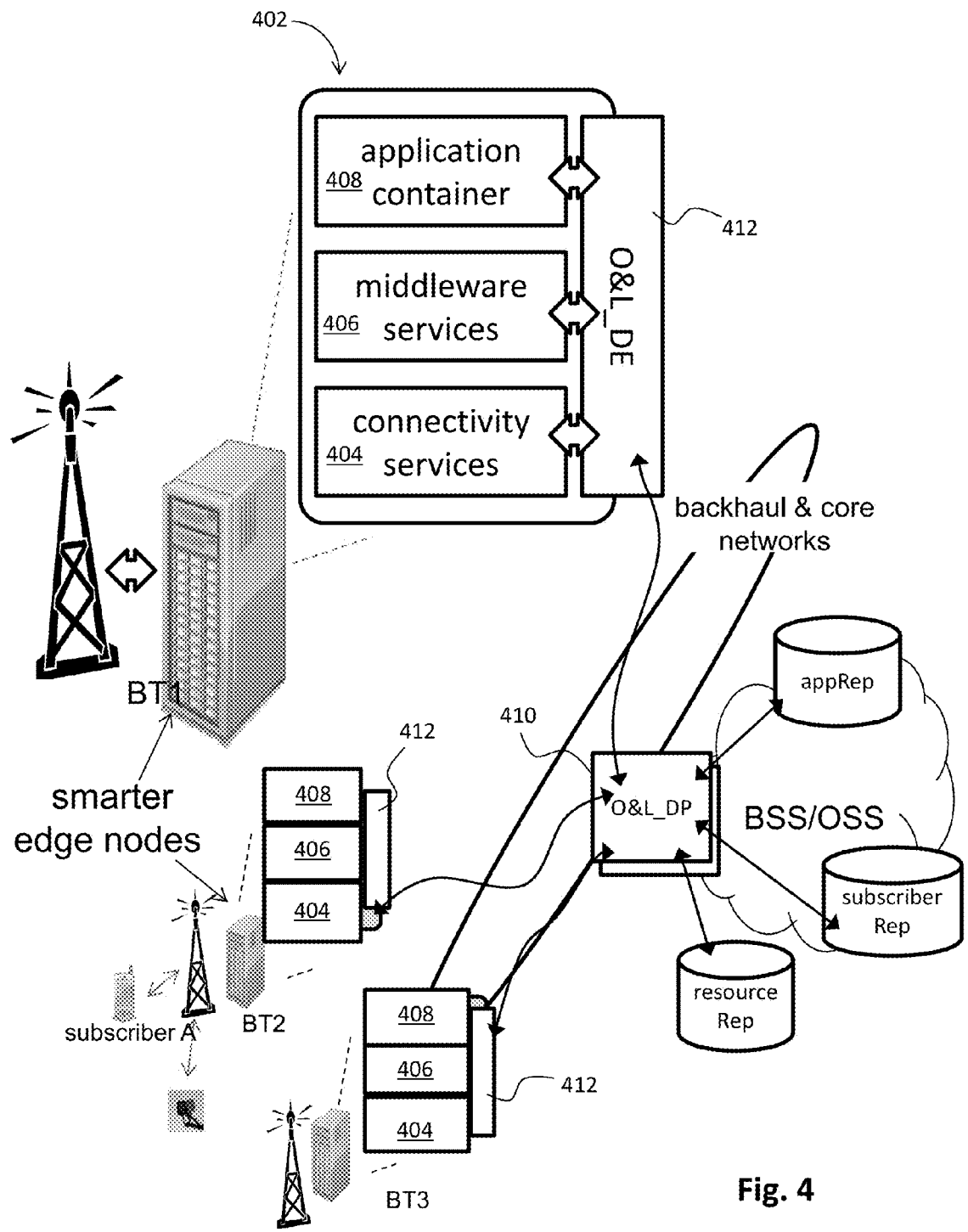
FIG. 4 shows a generic stack of software modules expected to reside on the smart edge nodes to service applications on the edge devices according to one embodiment of the present invention.

In one embodiment, an application may exist on the selected (smart) edge nodes. FIG. 4 shows a generic stack of software modules expected to reside on the smart edge nodes to service applications on the edge devices 402 according to one embodiment of the present invention. In an embodiment, each edge device 402 includes an edge data processing platform (EDPP). The EDPP provides a stack containing a connectivity services layer 404 used by the edge node to manage its connection to the edge device, and other cellular network nodes, such as other edge nodes. The stack may also contain a middleware services layer 406 to hide the technology specifics of the lower layers to higher layers and also provide value-add to them such as content cache, quality of service, content adaptation and distribution, billing, data offload, etc.

Finally, the stack may also contain an application layer 408, where applications reside to offer services to edge devices.

Each edge device 402 may be connected to an operation and lifecycle decision point (O&L_DP) 410. The O&L_DP modules supervise various operation and lifecycle decision enforcement points (O&L_DE) 412. The O&L_DP sets rules under which the O&L_DE operate to manage the applications running in the edge nodes, according to one embodiment of the present invention. The operation and lifecycle decision points 410 of the management module may be located on the network providers business support/operation support systems (BSS/OSS) having access to the subscriber information, service information, resources (e.g., capacity and utilization of base stations), application repository, etc.

After selecting step 306 is completed, the method continues to identifying step 308. At identifying step 308, an operating context may be identified for executing applications on the edge node. The operating context may include, for example, the spatiotemporal context of mobile device end users. The spatiotemporal context may include the anticipated spatiotemporal context of mobile device end users. The anticipated spatiotemporal context may be derived from the mobility patterns of mobile device end users. For example, the mobility of users may determine where the user will be in, say, ten minutes, which is the anticipated spatiotemporal context of the user. After identifying step 308 is completed, the method continues to configuring step 310.

At configuring step 310, computer executable instructions at the edge node may be configured according to the identified operating context. After configuring step 310 is completed, the method continues to providing step 312.

At providing step 312, services may be provided in response to anticipated future context of the mobile device end users. After configuring step 312 is completed, the method continues to managing step 314.

At managing step 314, the operation and lifecycle of the application may be managed on the edge node in response to the identified operating context. In an embodiment, a management module that manages the operation and lifecycle of applications for mobile device end users may include a distributed collection of operation and lifecycle decision points and corresponding decision enforcers.

In one example embodiment, consider a find-a-friend service to which subscriber A may subscribe to. This service allows the subscriber to locate friends in her vicinity. This service is typically offered by third-party online application services providers that correlate GPS information they receive in their back-end servers from corresponding client applications (apps) running on subscriber smartphones. Due to the inherent locality aspect of the application, it is expected that local execution of the application on an edge node will significantly reduce the backhaul traffic generated by all the smartphones reporting in their location. It may also significantly reduce the response time and real-time operation time that is required for an application to work; hence the quality of experience (QoE) will improve. Suppose that for a period of time (e.g., early morning hours), no one makes use of this application. Hence, the O&L_DP may instruct the O&L_DE in a particular base station, for example BT2 (see FIG. 4), to deactivate the application with the option to archive it locally, or erase it entirely. At some point, the smartphone of subscriber A may connect to BT2 and subsequently, O&L_DE learns of this event from the services provided by the corresponding connectivity services layer. It communicates this event to its supervising O&L_DP which consults the subscriber repository to find out what services the subscriber uses. Upon discovery that the subscriber subscribes to the find-a-friend service, the O&L_DP instructs the O&L_DE to load the application (if not already loaded) and is ready to serve the subscriber. The O&L_DP may further provide a copy of the map that corresponds to the geographical coverage of radio transmitters and receivers at BT2. This is an example of contextual configuration of an application where a generic application (find-a-friend) is provisioned to operate in a particular area (the coverage area of BT2).

The above example shows a case where O&L_DE is being instructed from its supervising O&L_DP to activate and configure a specific application. In other embodiments, O&L_DE modules may coordinate with each other, especially when a mobile user handoffs from one base station to the next. In this case, the O&l_DE in the origin base station may instruct the O&l_DE of the potential destination base stations in advance of what services subscriber A subscribes to (and even the specific services the subscriber currently engages with) so that the destination base station prepares itself to serve the application needs of the subscriber upon handoff.

In yet another embodiment, if an O&l_DE does not have enough resources to execute, say the find-a-friend application locally, after inquiring its resource status repository or upon request from the O&l_DE, the supervising O&l_DP may instruct a corresponding RNC to execute the application instead.

In another example embodiment, the application may involve a city safety application involving a number of collections of sensors including acoustic, day cameras, night (e.g., infrared) cameras, light sensor, etc. Due to the higher energy and bandwidth requirements of cameras as compared to acoustic sensors, the application is designed to conserve energy by using the acoustic sensor continuously and the cameras intermittently (or at low resolution) until the acoustic sensors listen to a "disturbances" in which case they instruct full use of the cameras. The video feeds are either stored locally for future retrieval or send to a back-end operator for further action.

This is yet another example of where local execution of the application can significantly accelerate the response of the system. It is also a location dependent application requiring configuration from neighborhood to neighborhood (and from city to city if the application is deployed in multiple cities). For example, based on the street and building topology, size, and orientation of buildings, each area may have different rules as for when it is better to engage the day cameras or the night cameras. Thus, the operating context in this embodiment is a temporal context of stationary sensors. It will be very labor intensive, hence, expensive to configure these rules by dispatching technical crews to manually configure these for each locality. Instead, the rules can be entered and managed in the O&l_DP which can then provision each instance of the application in the different locations by instructing the corresponding O&l_DP to configure the application accordingly. Furthermore, the O&L_EP may activate and deactivate as necessary the video processor modules that correspond to the processing of the day or night cameras depending on when and where they are needed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operating and managing data and application services at an edge of a network, the method comprising:
    executing an application on an edge node, wherein the edge node provides services to mobile device end users on the edge of the network;
    identifying an operating context for executing the application on the edge node; and
    managing an operation and lifecycle of the application on the edge node in response to the identified operating context;
    wherein the identified operating context includes a spatiotemporal context of the mobile device end users; and
    wherein the spatiotemporal context includes anticipated spatiotemporal context of the mobile device end users, wherein the anticipated spatiotemporal context is derived from mobility patterns of mobile device end users.

2. The method of claim 1, wherein the operating context includes the mobility patterns of the mobile device end users.

3. The method of claim 1, further comprising selecting the edge node for execution of the application from a plurality of edge nodes, wherein the edge node is responsive to the identified operating context.

4. The method of claim 1, wherein identifying the operating context includes identifying application services currently used by mobile device end users.

5. The method of claim 1, further comprising configuring computer executable instructions at the edge node according to the identified operating context.

6. The method of claim 1, further comprising providing services in response to anticipated future context of the mobile device end users.

7. The method of claim 1, wherein the operating context includes a temporal context of stationary sensors.

* * * * *